US 9,322,258 B2

(12) United States Patent
Henson et al.

(10) Patent No.: US 9,322,258 B2
(45) Date of Patent: Apr. 26, 2016

(54) WATER CONVERSION SYSTEM

(75) Inventors: Larry K. Henson, Jacksonville, FL (US); Edward C. Szvetecz, Atlanta, GA (US)

(73) Assignee: Advanced Aqua Group, Jacksonville, FL (US)

(*) Notice: Subject to any disclaimer, the term of this patent is extended or adjusted under 35 U.S.C. 154(b) by 973 days.

(21) Appl. No.: 13/304,158

(22) Filed: Nov. 23, 2011

(65) Prior Publication Data

US 2013/0126174 A1    May 23, 2013

(51) Int. Cl.
| B01D 61/00 | (2006.01) |
| B01D 63/00 | (2006.01) |
| B01D 21/00 | (2006.01) |
| C02F 1/52 | (2006.01) |
| E21B 43/26 | (2006.01) |
| F24J 3/08 | (2006.01) |

(52) U.S. Cl.
CPC .. *E21B 43/26* (2013.01); *F24J 3/08* (2013.01); *Y02E 10/10* (2013.01)

(58) Field of Classification Search
CPC .............. C02F 1/44; C02F 9/02; C02F 9/463; C02F 9/52; C02F 9/58; C02F 9/72; B01D 61/00
USPC .......... 210/652, 257.2, 195.2, 206, 650, 721, 210/758, 175, 651; 166/267
See application file for complete search history.

(56) References Cited

U.S. PATENT DOCUMENTS

| 4,534,869 | A |   | 8/1985 | Seibert |
| 4,752,389 | A | * | 6/1988 | Burrows ...................... 210/181 |
| 5,372,596 | A |   | 12/1994 | Klicek et al. |
| 5,501,798 | A | * | 3/1996 | Al-Samadi et al. ........... 210/652 |
| 5,547,584 | A | * | 8/1996 | Capehart ....................... 210/669 |
| 6,294,061 | B1 |   | 9/2001 | Morkovsky et al. |
| 6,355,145 | B1 |   | 3/2002 | Kresnyak et al. |
| 6,375,803 | B1 |   | 4/2002 | Razzaghi et al. |
| 6,536,523 | B1 |   | 3/2003 | Kresnyak et al. |
| 6,551,466 | B1 |   | 4/2003 | Kresnyak et al. |
| 7,501,061 | B2 | * | 3/2009 | Wood et al. .................... 210/636 |

(Continued)

FOREIGN PATENT DOCUMENTS

| ES | 2165824 A1 | 3/2002 |
| KR | 20060078594 A | 7/2006 |
| WO | WO-2007013099 A1 | 2/2007 |

OTHER PUBLICATIONS

International Search Report in PCT Application No. PCT/US2012/065819 dated Jan. 25, 2013, 3 pages.

(Continued)

*Primary Examiner* — Ana Fortuna
(74) *Attorney, Agent, or Firm* — Haynes and Boone, LLP

(57) ABSTRACT

A mobile water conversion system including an electro-coagulation stage, a microfiltration stage, a cooling stage, a nanofiltration stage, and a reverse osmosis stage. The electro-coagulation stage receives heated input water, such as geothermal brackish water, and reduces total suspended solids. The microfiltration stage removes suspended solids and dissolved solids. The cooling stage provides cooled brine water. The nanofiltration stage removes hardness from the cooled brine water to provide sodium brine water. A portion of sodium brine water is provided to circulating water in the cooling stage. The reverse osmosis stage reduces sodium content and provides fresh water suitable for a specified purpose, such as fracking.

18 Claims, 7 Drawing Sheets

(56) References Cited

U.S. PATENT DOCUMENTS

| | | | |
|---|---|---|---|
| 7,520,993 B1* | 4/2009 | Laraway et al. | 210/652 |
| 8,731,854 B2* | 5/2014 | Martin | 702/61 |
| 2003/0173300 A1* | 9/2003 | Bradley | B01D 17/0217 |
| | | | 210/665 |
| 2005/0011839 A1 | 1/2005 | Dart et al. | |
| 2005/0269271 A1 | 12/2005 | Umezawa et al. | |
| 2007/0102359 A1* | 5/2007 | Lombardi et al. | 210/639 |
| 2009/0107915 A1* | 4/2009 | Skinner et al. | 210/636 |
| 2009/0114598 A1 | 5/2009 | van Kralingen et al. | |
| 2010/0126932 A1* | 5/2010 | Powell | 210/631 |
| 2010/0193360 A1 | 8/2010 | McGuire et al. | |
| 2010/0219082 A1 | 9/2010 | Diaz Gonzalez Alcocer | |
| 2011/0089123 A1 | 4/2011 | Kennedy et al. | |
| 2011/0180422 A1 | 7/2011 | Mothersbaugh et al. | |
| 2011/0201701 A1 | 8/2011 | Lucas et al. | |
| 2011/0210075 A1* | 9/2011 | Enos | C02F 1/4602 |
| | | | 210/702 |
| 2011/0266227 A1 | 11/2011 | Yamaguchi et al. | |
| 2013/0056413 A1* | 3/2013 | Miranzadeh et al. | 210/636 |
| 2013/0126174 A1* | 5/2013 | Henson | E21B 43/26 |
| | | | 166/308.1 |
| 2013/0199918 A1* | 8/2013 | Jones et al. | 201/6 |

OTHER PUBLICATIONS

Koch Membrane Systems; "Tubular Membranes Provide a Constant Flow of Solid Solutions," www.kochmembrane.com/prod_tubular.html; 2011.

Magnus, Richard; "Fountain Quail Water Management Press Release," Oct. 25, 2011; Roanoke, Texas.

\* cited by examiner

WATER CONVERSION SYSTEM

BACKGROUND

1. Field of Invention

This invention pertains to large scale, industrial water purification systems for reducing total suspended solids (TSS) and total dissolved solids (TDS) from brackish or contaminated water. More particularly, the invention pertains to a mobile water conversion system for providing essentially potable water in quantities of 10,000 barrels a day and more at a local site, such as an oil fracking site.

2. Description of the Related Art

Historically, fresh water has been treated as an unlimited natural resource usually controlled by governments in most parts of the world. Governments have often kept the price artificially low while keeping availability high. Overuse and waste have often followed.

The low price of water coupled with the difficulty in moving water over great distances serves to keep most fresh water use local. As both use and population increase, fresh water resources can reach their natural limit in some areas. Price increases normally follow.

Fresh water resources are often regarded as a commodity, but one that is still mostly controlled by governments. In many parts of the world, water is a critically limiting resource. Water is necessary for urban development (including personal use), agriculture, industry, landscaping, and consumptive uses (oil and natural gas development). In those areas with limited fresh water resources, the competing water uses are often allocated hierarchically. This allocation structure usually places personal use as the top priority and industrial use at the bottom.

Economic growth demands a reliable and cost effective supply of both water and energy. With industrial uses at or near the bottom of the priority list, industry is often left to seek out new ways to decrease water use while also searching for other sources of water such as wells. One of the more difficult problems of current-day governments and society in general is to balance the needs of economic growth and environmental protection. Thus, there is a significant need for water production that benefits economic growth without significantly detracting from the water environment.

Newer terminology labels water use as either consumptive or non-consumptive. Water use is non-consumptive if it is used and then returned to the local environment in some manner. Consumptive water use does not return the water to the environment after use because the water is lost. Two examples of major consumptive water uses are (1) heat rejection as in a cooling tower, and (2) fracking of rock in connection with the production of hydrocarbons.

Fracking operations require millions of gallons of water. Water for fracking is usually purchased from the excess of various local community supplies and then hauled to the drilling location via truck. Typical tanker trucks haul 6,000-8,000 gallons per load. Such methods for obtaining and delivering water are costly and, as we will see, inefficient. Additionally, the amount of truck traffic necessary to deliver so much water from the producer to the fracking site is a large contributor to air pollution and terrain destruction in the areas subjected to the traffic.

Obtaining sufficient water to assist in recovery of hydrocarbons is particularly difficult in the areas east of the Rocky Mountains. Hundreds of millions of years ago, this region was an inland sea. This inland sea resulted in profuse vegetation and sea life that gave rise to the abundant hydrocarbons in this area. As the sea dried up, it also left salts and other dissolvable minerals. Now the area gets little precipitation, with much of the region being semiarid. While such semiarid regions usually have little ground water in the underlying rock and soil, geography has created a substantial aquifer under the areas just east of the Rockies. Abundant water originates in the Rockies, and flows to the east, both in rivers and underground flow, getting deeper underground as it flows east. If this water is accessed in places such as Eastern Wyoming and Colorado, the Dakotas, Montana, Nebraska, Kansas, and Saskatchewan, deep wells must be drilled to reach it; and, as a result of deep mineral deposits, the water is brackish and generally not potable. It would be highly desirable if a way could be found to make this water accessible for industrial uses and for other uses. Since fracking areas are often remote and far from any water purification plants, it would be even more desirable if a system capable of converting large quantities of water in remote areas were available.

Fracking requires pumping millions of gallons of water into the ground to open fractures. Of this water, 75% is lost during the fracking operation. In conventional fracking operations, the water is often contaminated with chemicals, which degrades the local ground water. Approximately 25% of the fracking water is recovered as flow-back. However, flow-back water is severely contaminated and recovery is not cost effective at this time, so that it is typically disposed of. If injected back into the ground in shallow wells, it would contaminate drinking water. Thus, it generally is disposed of in lined pits and deep well injection, both of which are costly. Further, loss of ground water on this scale is leading many local and state governments to impose restrictions and moratoriums on the use of freshwater resources for consumptive use. Thus, it would be highly desirable if a way could be found to locally convert brackish water to potable water in an economical manner.

BRIEF SUMMARY OF THE INVENTION

The invention solves the above and other problems by providing a water conversion system that produces fresh water from brackish water. Preferably, the water conversion system is mobile, and the mobile water conversion system can produce water of fresh water quality at a rate of one hundred gallons per minute, more preferably at the rate of five hundred gallons per minute, and most preferably at the rate of one thousand gallons per minute. The water conversion system according to the invention preferably includes an electro-coagulation stage, a microfiltration stage, a cooling stage, a nanofiltration stage, and a reverse osmosis stage. Preferably, the electro-coagulation (EC) stage receives heated input water, such as geothermal brackish water, and removes suspended solids from the heated input water, and provides heated EC water. Preferably, the microfiltration (UF) stage receives the heated EC water from the electro-coagulation stage and removes the remaining suspended solids and at least a portion of the dissolved solids from the heated EC water and provides heated MF water. Preferably, the cooling stage receives the heated MF water from the microfiltration stage and includes circulating cooling stage water that cools the heated MF water to provide cooled brine water. The nanofiltration stage preferably receives the cooled brine water and removes hardness from the cooled brine water to provide sodium brine water. Preferably, a portion of the sodium brine water is provided to the circulating water in the cooling stage, and the circulating water has substantially the same chemical content as the sodium brine water. Here, "substantially the same" means that the TDS and TSS of the circulating water and the sodium brine water include the same compounds, though the concentration of the sodium compounds may be somewhat greater in the circulating water. Preferably, the reverse osmosis stage receives the sodium brine water from the nanofiltration stage, reduces the sodium content from the sodium brine water, and provides fresh water that is preferably suitable for fracking in hydrocarbon production.

Herein, the term "hot" or "heated" means at a temperature above ambient temperature and "cooling" means reducing the temperature by an amount greater than what the temperature would be reduced by exposing it to ambient temperature. More preferably, "heated" means 105° F. or more, and "cooling" means reducing the temperature by 10° F. or more. Preferably, the cooling systems according to the invention cool the water by 15° F. or more, and more preferably by 25° F. or more, and most preferably by 40° F. or more.

Fresh water quality is defined as water with a TDS of 750 parts per million (ppm) or less of dissolved salts and 50 ppm or less of suspended solids and a SAR (sodium absorption ratio) of less than 2. Brackish water is defined as water that has at least 500 parts per million of dissolved salts. Preferably, the brackish water entering the system also has suspended solids of 100 ppm or more. The U.S. Geological Survey (USGS) defines soft water as having 60 mg/l or less of dissolved calcium compounds. Herein, "soft water" is defined as having 60 mg/l or less of dissolved calcium and magnesium compounds.

The geothermal brackish water preferably is provided from at least 2,500 feet below ground and has a conductivity of at least 1,000 microsiemens.

In another embodiment, a disinfectant is added to the fresh quality water to provide potable water.

The initial cooling is preferably by fan cooled radiators. Geothermal cooling may also be used. In another embodiment, the cooling stage may be a cooling tower or a waste heat evaporator. The cooled brine water provided by the cooling stage is typically within a range between 40° F. and 80° F.

In the preferred embodiment, the water conversion system includes mobile platforms, such as trailers, for transporting the water conversion system. Each processing stage is secured to and operable from a mobile platform. Once the mobile platform is located at a desired water use location, the various stages are interconnected to make the water conversion system operational.

In another embodiment, the water conversion system includes a heating section to circulate heated water through each stage during an idle mode. Circulating heated water through each stage protects the water conversion system from freezing. The heating section preferably includes an idle mode heat exchanger that adjusts the temperature of the heated water. The heated water is typically geothermal brackish water and is maintained below 105° F. The cooling stage is preferably deactivated during the idle mode.

In another embodiment, a water conversion method provides fresh water from brackish water. In this embodiment, the water conversion method provides geothermally heated brackish water to the water conversion system, and suspended solids are removed from the heated water via electro-coagulation. The heated water improves electro-coagulation efficiency. Some dissolved solids and any remaining suspended solids may be removed from the heated water via microfiltration to provide brine water. The heated water improves microfiltration efficiency. The brine water may then be cooled via a zero liquid discharge cooling stage that includes circulating water to cool the brine water. Hardness and preferably other salts may be removed from the cooled brine water via nanofiltration to provide sodium brine water. A portion of the sodium brine water may be provided to the circulating water in the cooling stage so that the circulating water has substantially the same chemical content as the sodium brine water. Sodium brine content may then be removed from the sodium brine water via reverse osmosis to provide fresh water suitable for a specified purpose, such as fracking for hydrocarbon production. In another embodiment, disinfecting the fresh water provides potable water.

The invention provides a method of below-ground fracking, the method comprising: providing a mobile platform and a water conversion system mounted on the mobile platform, the water conversion system capable of converting 100 gallons of water a minute or more; connecting the water conversion system to a geothermal water source; providing brackish water from the geothermal water source, the water containing suspended solids and dissolved solids, the amount of the suspended solids being in excess of the amount of suspended solids required for water of fresh water quality and the amount of the dissolved solids being in excess of the amount of the dissolved solids required for water of fresh water quality; using the water conversion system, removing the suspended solids in excess of the amount of solids required for water of fresh water quality; after the removing of the suspended solids, cooling to provide cooled water; removing from the cooled water the dissolved solids which are in excess of the amount of dissolved solids required for water of fresh water quality to provide converted water of fresh water quality; and using the converted water to create fractures in the ground below the ground surface. Preferably, the providing brackish water comprises providing water at a temperature of 105° F. or more, and the cooling the water comprises cooling the water in the amount of 10° F. or more. Preferably, the removing of the suspended solids comprises electro-coagulation. Preferably, the removing of the suspended solids further comprises microfiltration using a microfiltration unit. Preferably, the removing of the dissolved solids comprises nanofiltration using a nanofiltration unit and reverse osmosis using a reverse osmosis unit. Preferably, the cooling comprises evaporative cooling and further comprising replacing the water lost by evaporation with at least a portion of the water from the nanofiltration unit. Preferably, the method further comprises balancing the water flow thorough the water conversion system by breaking the flow of water between the electro-coagulation unit using a first tank, breaking the flow of water between the microfiltration unit and the nanofiltration unit using a second tank, and breaking the flow of water between the nanofiltration unit and the reverse osmosis unit using a third tank. Preferably, the method further comprises balancing the chemistry of the converted water by adding acid to the water before or during the nanofiltration or before or during the reverse osmosis. Preferably, the cooling comprises geothermal cooling. Preferably, the conversion is performed with less than ten percent blow-down.

In another aspect, the invention provides a water conversion system for providing fresh water at a location where it is needed, the system comprising: a water input for providing heated input water containing suspended solids and dissolved solids; an electro-coagulation (EC) stage in fluid communication with the water input for receiving the heated water, and for removing at least a portion of the total suspended solids (TSS) in the heated water to provide heated EC water; a microfiltration (MF) stage in fluid communication with the EC stage for receiving the heated EC water and for removing at least a portion of any remaining suspended solids and at least a portion of the total dissolved solids (TDS) from the heated EC water to provide heated MF water; a cooling stage in fluid communication with the MF stage for receiving the heated MF water from the microfiltration stage and for cooling the MF water to provide cooled water; a nanofiltration (NF) stage in fluid communication with the cooling stage for receiving the cooled water and for removing at least a portion of the dissolved calcium and magnesium compounds from the cooled water to provide softened water, the nanofiltration stage having a nanofiltration stage output, the softened water provided to the nanofiltration stage output; and a reverse osmosis (RO) stage in fluid communication with the nanofiltration stage output for receiving the softened water and for removing at least a portion of the sodium content from the softened water to provide fresh water of fresh water quality. Preferably, the cooling stage includes circulating cooling stage water and further comprising a water conduit connecting the nanofiltration stage to the cooling stage to provide a portion of the softened water to the circulating water in the cooling stage. Preferably, the water conversion system further includes a geothermal brackish water source connected to the water input. Preferably, the geothermal brackish water has a conductivity of at least 1,000 microsiemens. Preferably, the water conversion system further comprises a disinfection unit connected to the water conversion system for providing potable water. Preferably, the cooled water has a temperature between 40° F. and 80° F. Preferably, the cooling stage is selected from the group consisting of a cooling tower and a waste heat evaporator. Preferably, the water conversion system further comprises one or more mobile platforms for transporting the water conversion system, wherein each of the stages are secured to and operable from at least one of the mobile platforms. Preferably, the water conversion system further comprises a heating stage that circulates heated water through each stage of the water conversion system during an idle mode. Preferably, the water conversion system further includes a first flow break tank containing first tank water between the EC and MF stages, a second flow break tank containing second tank water between the MF and NF stages, and a third flow break tank containing third tank water between the NF and RO stages. Preferably, the water conversion system further includes a source of an acid and a metering system for adding acid to the second tank water prior to or at the NF stage or to the third tank water prior to or at the RO stage.

In yet another aspect, the invention provides a water conversion method for providing fresh water from brackish water, the water conversion method comprising: providing a source of heated brackish water at a temperature of 105° F. or more; removing suspended solids from the heated water via electro-coagulation; removing solids from the heated water via microfiltration; cooling the heated water to provide cooled brine water; removing magnesium or calcium compounds from the cooled brine water via a nanofiltration stage to provide softened sodium brine water; and reducing the sodium brine content of the sodium brine water via reverse osmosis to provide fresh water of fresh water quality. Preferably, the cooling comprises circulating cooling stage water through a cooling stage and further comprising providing a portion of the softened sodium brine water to the circulating cooling stage water, so that the circulating water has substantially the same chemical content as the sodium brine water provided by the nanofiltration stage. Preferably, the cooling process has essentially zero blow-down. Preferably, the water conversion method further comprises disinfecting the fresh water to produce potable water. Preferably, the temperature of the cooled brine water is between 40° F. and 80° F. Preferably, the cooling comprises air cooling. The cooling system preferably also includes an evaporative cooling process selected from the group consisting of vaporization from a cooling tower and waste heat evaporation. Preferably, the water conversion method further comprises circulating heated water through the water conversion system during an idle mode to protect the water conversion system from freezing, wherein the idle mode comprises deactivating the cooling.

In still another aspect, the invention provides a water cooling system comprising: a cooling stage that includes circulating water and provides cooled water of a first hardness concentration; a nanofiltration stage in fluid communication with the cooling state for removing hardness from the cooled water to provide softened water having a second hardness concentration less than the first hardness concentration; and a conduit connecting the nanofiltration stage and the cooling stage for providing an amount of the softened water to the circulating water so that the circulating water has substantially the same chemical content as the softened water, thereby eliminating the need for blow-down of the circulating water. Preferably, the second hardness concentration is less than one percent of the first hardness concentration. Preferably, the cooling stage is selected from the group consisting of a cooling tower and a waste heat evaporator. Preferably, the amount of softened water provided to the circulating water is sufficient to replace water lost by evaporation.

In a further aspect, the invention provides a water cooling method comprising: receiving input water having a first hardness concentration and a first temperature; cooling the input water using circulating water in a cooling stage to provide cooled water, the cooled water having a second temperature that is reduced by at least 5° F. from the first temperature; removing hardness from the cooled water via nanofiltration to provide softened water having a second hardness concentration that is one percent or less of the first hardness concentration; and providing an amount of the softened water to the circulating water so that the circulating water has substantially the same chemical content as the softened water. Preferably, the need for blow-down of the circulating water is eliminated. Preferably, the cooling comprises a process selected from the group consisting of evaporation of water in a cooling tower and waste heat evaporation. Preferably, the amount of softened water provided to the circulating water is an amount sufficient to replace water lost from evaporation. Preferably, the removing hardness comprises removing substantially all hardness from the cooled water to provide the softened water. Preferably, the method further comprises inhibiting corrosion within the cooling stage via providing the softened water to the circulating water.

The water conversion system according to the invention not only provides a source of fresh water in remote, arid areas, but also can be easily moved to new locations. In addition, it provides fresh water in quantities needed for fracking without degrading local water quality. It can provide potable water in emergencies such as hurricanes and other natural or man-made disasters that disrupt or contaminate the normal water supply. Numerous other features, objects, and advantages of the invention will become apparent from the following description when read in conjunction with the accompanying drawings.

BRIEF DESCRIPTION OF THE DRAWINGS

The above-mentioned features will become more clearly understood from the following detailed description read together with the drawings in which.

DETAILED DESCRIPTION

Figure 1:
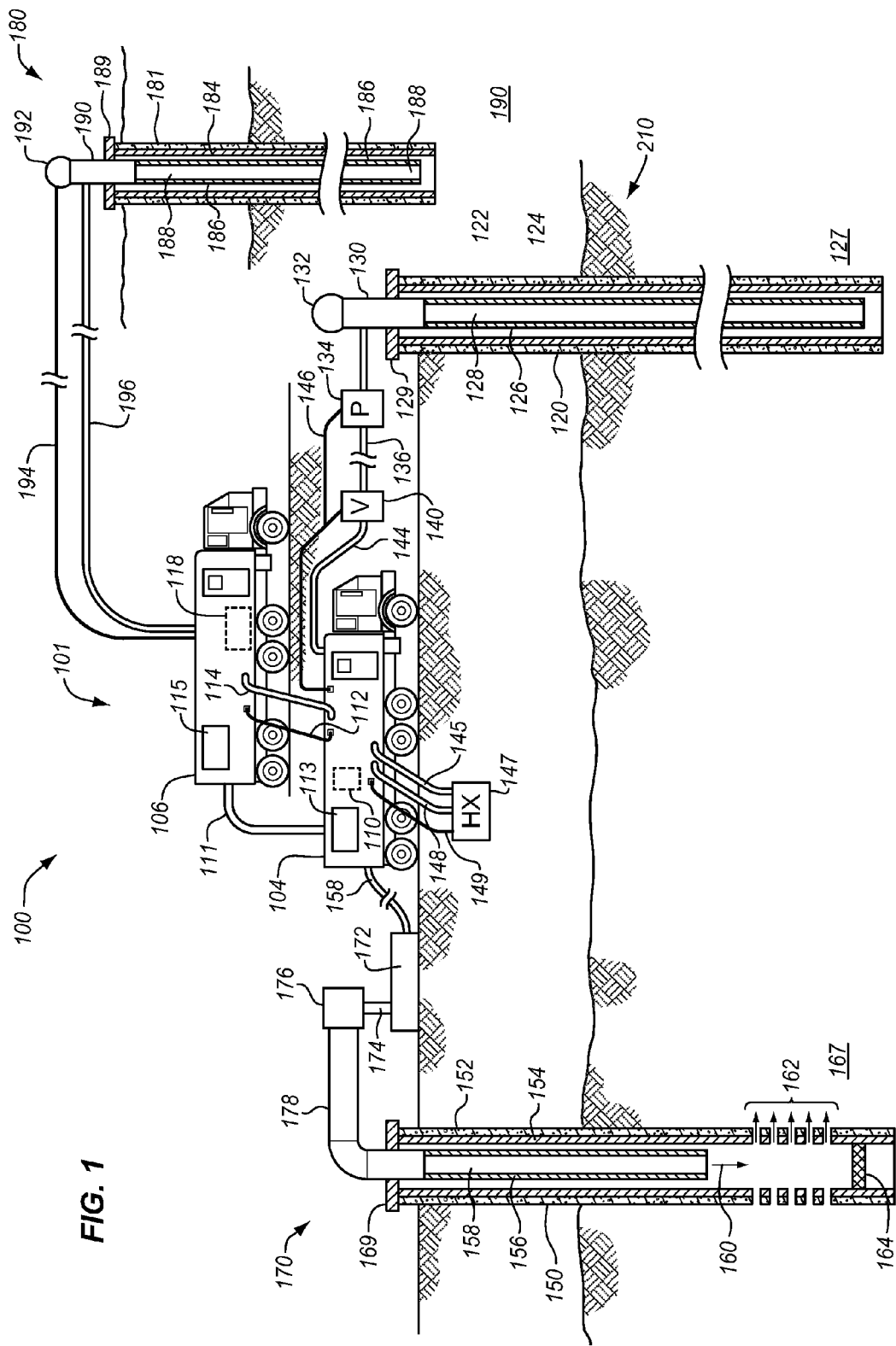
FIG. 1 illustrates a preferred application of the preferred embodiment of the water conversion system according to the invention.

Systems and methods for providing chemically homogenous clean water within close geographical proximity to an intended water use area or region are disclosed herein. More specifically, there is described a mobile and environmentally friendly system for removing dissolved materials, thereby reducing total dissolved solids (TDS), and for removing non-dissolved materials, thereby reducing total suspended solids (TSS) from brackish or contaminated water to provide a mobile fresh water and/or potable water source.

In one exemplary use, the water conversion system converts the water in the brackish water aquifer above oil shale, such as in the Bakken formation in Montana, Wyoming, Saskatchewan, and the Dakotas. Fresh water is provided locally for drilling and fracturing operations, thus saving money and air pollution caused by conventional practices of using trucks to ship water over great distances, sometimes hundreds of miles, to drilling and fracturing sites. Further, it provides for the use of clean water for drilling and fracturing operations, thus preventing contamination of ground water resources.

Herein, the term "hot" or "heated" means at a temperature of 105° F. or more. Fresh water quality is defined as water with TDS of 750 parts per million (ppm) or less of dissolved salts and 50 ppm or less of suspended solids. Brackish water is defined as water that has at least 500 parts per million of dissolved salts or suspended solids. The U.S. Geological Survey (USGS) defines soft water as having 60 mg/l or less of dissolved calcium compounds. Herein, "soft water" is defined as having 60 mg/l or less of dissolved calcium and magnesium compounds. Most potable water in the US has a TDS level of 100 to 350 parts per million (ppm). Herein, "potable water" is defined as water having a TDS level of less than 750 ppm and is safe for humans to drink as defined under the federal Safe Drinking Water Act (SDWA: Pub.L. 93-523; 42 U.S.C. §300f et seq. Dec. 16, 1974).

A feature of the invention is that the water conversion is performed with relatively small blow-down. Generally, blow-down is the water that is drained from cooling equipment to remove mineral build-up. This water may also be called "bleed" water. In this disclosure, "total blow-down" means the total water bleed from the entire system, including tanks 270, 330, and 380, plus cooling systems 240 and 320. Generally, cooling systems that rely on the latent heat of evaporation of the water for the cooling require blow-down because, as the water evaporates, the mineral content of the remaining water increases in concentration. If left undiluted, these minerals will cause scaling on equipment surfaces, possibly damaging the system. The blow-down water usually is pumped into a wastewater well 180 or lined storage area. In some cases, this water can be reused for irrigation and other selected uses. Blow-down water often has two to five times higher mineral content than potable water. In the prior art, depending on the supply water and the cooling system operation, the blow-down water TDS can range from 500 to 1300 ppm. A feature of the present invention is that the blow-down from the cooling system 320 is essentially zero, and the total amount of blow-down water in the system 100 is less than ten percent of the amount of converted water.

FIG. 1 illustrates a plan view of an application of the invention 100, such as may be used in fracturing operations. The system 100 according to the invention preferably is carried on a mobile platform 101, which, in this embodiment, comprises a plurality of semi-trailers 104 and 106. In other embodiments, the mobile platform may be one or more railway cars or one or more boats, barges, or ships. In this embodiment, brackish water is obtained from a well 210, cleaned in system 100, and used in a fracking well 170. In other embodiments, the hot water is pumped to the water conversion system 100 from any place where the water is located. A small amount of waste water may be pumped into a deep waste water well 180 that is a significant distance below the potable water sources in the locality. The amount of waste water is preferably 10% or less of the incoming brackish water, and more preferably 7% or less, and most preferably 5% or less. Further, the waste water preferably is essentially free of chemicals harmful to human beings, animals, and other life. In the preferred embodiment, the waste water is water that contains minerals and metal compounds, such as salts, in lower concentrations than similar compounds were present in the brackish input water. In any event, the net result of the invention is that the overall quality of the water that is returned to the local environment by the invention is improved over the quality of water drawn from the local environment.

Water source well 210 includes metal well casing 124 surrounded by a cement casing 122, a drop pipe 126 forming a water passage 128, a well cap 129, a valve 130, and a valve control 132. Well 210 may be near first mobile platform 104 or at some distance. Pump 134 pumps water out of well 210 and drives it to first mobile platform 104 via hose 136, local valve 140, and hose 144. While, for completeness, control of valve 140 and pump 134 by the system of the invention 100 via electrical cable 146 is shown in FIG. 1, in one preferred embodiment, water is provided on conduit 144 by a separate contractor and system. Mobile platforms 104 and 106 communicate both hydraulically and electrically. These communications preferably include input water conduit 114, output water conduit 111, and electrical cable 112. The hydraulic connections between platforms 104, 106 may be serial or parallel. In serial hydraulic connection, certain purification steps are performed in first platform 104, and different purification steps are performed in second platform 106. In parallel hydraulic connection, essentially the same purification steps are performed in each platform and each platform performs essentially all the steps from brackish water to fully cleaned water. In parallel connection, some of the brackish water is delivered to second platform 106 via conduit 114, cleaned water is delivered to first platform 104 via conduit 111, and all the cleaned water from both platforms is delivered to water storage unit 172 via conduit 158. Alternatively, a separate brackish water conduit 144 may connect to each platform 104, 106. Preferably, both platforms include a cooling vent 113 and 115. As will be seen below, vents 113, 115 provide vents for a fan cooling system 515. System 100 of FIG. 1 also includes a geothermal ground heat exchange system 147, hydraulically connected to first platform 104 via conduits 145 and 148 and electrically connected to first platform 104 via cable 149. Similarly, other platforms may also have a geothermal heat exchange system. One or more of the platforms 104, 106 includes a generator, such as 114, to provide power to the system. Preferably, all parts of the system 100 according to the invention are controlled by a control system 110 in first platform 104 via electrical cables 112, 146, 149, and 194.

Waste water is provided to waste water well 180 via conduit 196. Waste water well 180 preferably comprises a metal well casing 181 surrounded by a cement casing 184, a drop pipe 186 forming a water passage 188, a well cap 189, a valve 190, and a valve control 192. Fracking well 170 preferably comprises metal well casing 154 surrounded by a cement casing 152, a drop pipe 176 forming a water passage 158, a well plug 164, a well cap 169, a pump and valve system 176, and a conduit 174 connected to water storage 172. Water storage 172 is preferably a pond, but may be a water storage tank or other water storage system. Fracking well casings 152 and 154 have fracking openings 162 through which a fracking solution 160 is forced to open fractures in oil- or gas-bearing substrate 167.

Figure 2A:
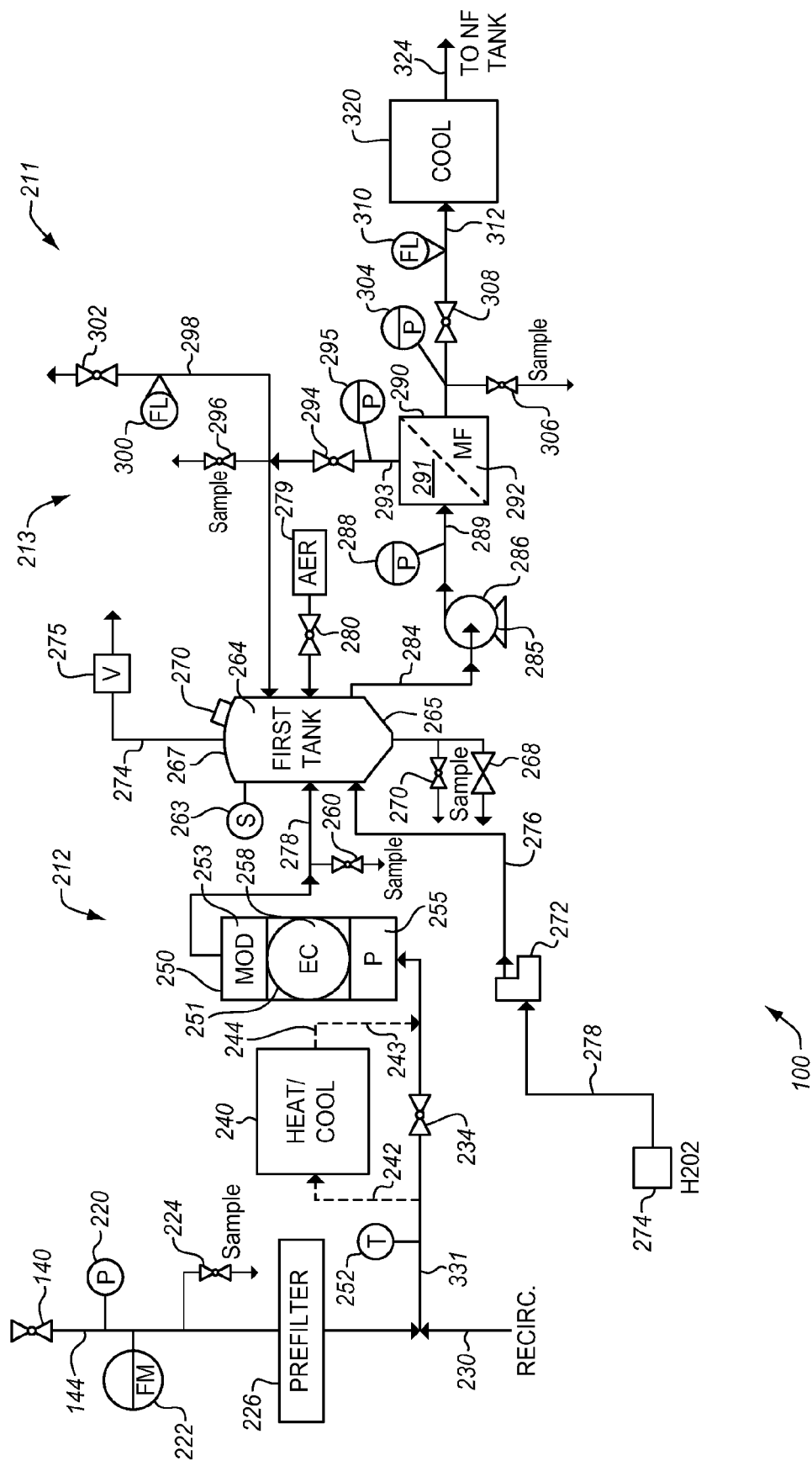
FIGS. 2A and 2B together provide a block diagram illustrating a preferred embodiment of the water conversion system utilized in the application of FIG. 1.
Figure 2B:
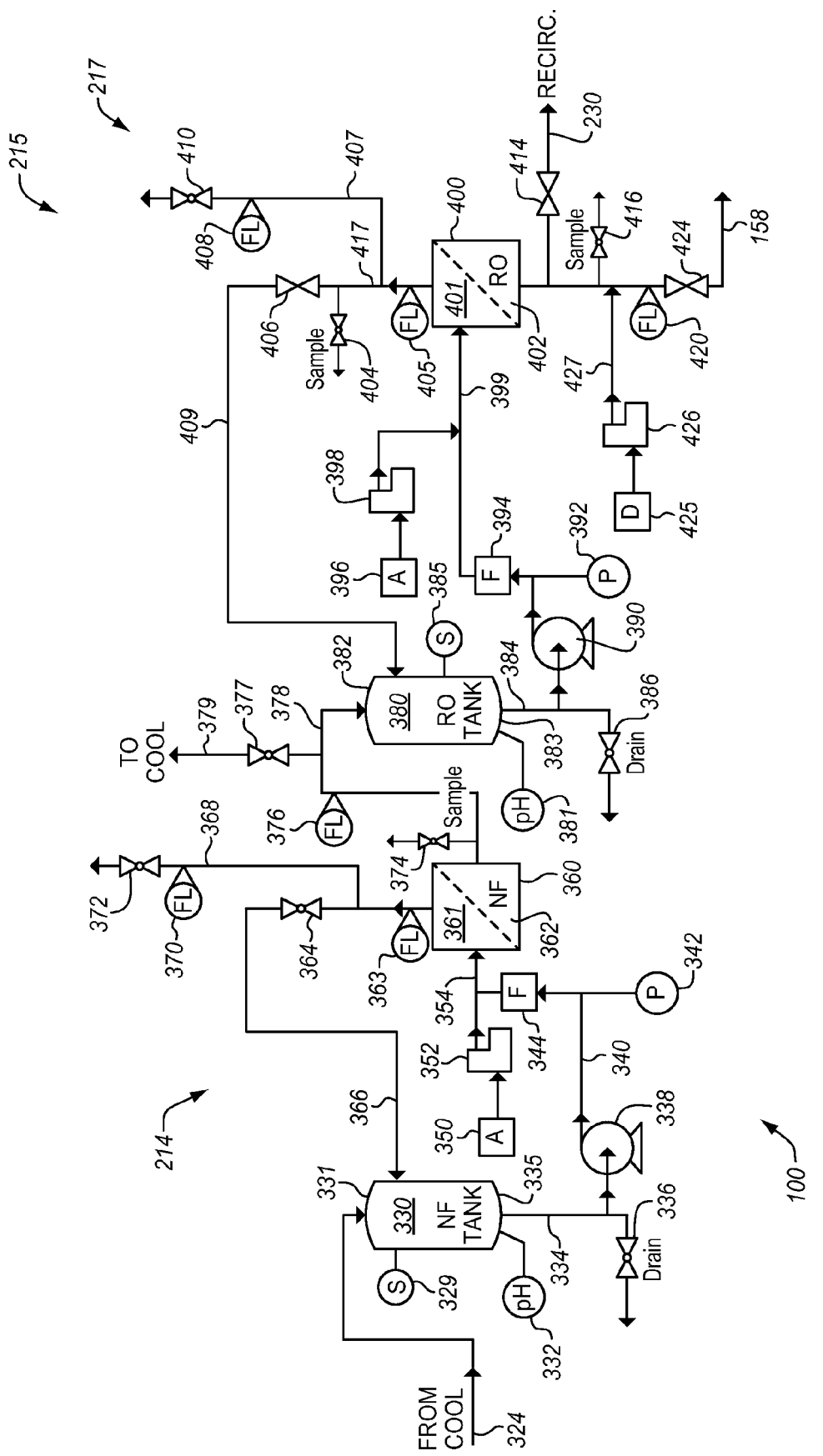

FIGS. 2A and 2B together provide a block diagram illustrating the preferred embodiment of the water conversion system utilized in the application of FIG. 1. Brackish water is input via line 144, which is preferably a hose but may be any other suitable conduit. A pressure gauge 220 measures the input pressure, and a flow meter 222 measures the input flow. The outputs of pressure gauge 220, flow meter 222, and the other gauges discussed herein preferably is communicated to control system 110, which is described in detail in connection with FIG. 5, and preferably also provided on a visible display, to provide another level of safety and control. The input water may be sampled via valve 224. A prefilter 226 is connected in the flow path of input line 144. Prefilter 226 is preferably a screen that removes all particles larger than a selected prefilter size, which in the preferred embodiment is one/thirty-second of an inch or larger, to protect the system 100 from damage. Line 230 is connectable to the outlet of the system (FIG. 2B) to provide the option of diluting the input water with a source of clean water for purposes such as maintaining a desired flow through the system, adjusting the temperature of the input water, or running the water through the system multiple times. Temperature gauge 232 is connected to input line 231, and valve 234 together with valve 428 (FIG. 3) permits the flow of water through heat/cool system 240 via conduits 242 and 243 to be adjusted so that all or some of it passes through or by-passes heat/cool system 240, which will be described below.

Water flow in system 100 continues to electro-coagulation unit 250. Electro-coagulation unit 250 preferably comprises a pump 255, a power drive 253, and coagulation reactor 258. Preferably, power drive 253 is a pulsed drive, and coagulation reactor 258 is a metal hydroxide reactor. In embodiment 100, the electro-coagulation unit 250 is an EC Electro-Coagulator Model No. LPR120-2-EC electro-coagulator made by GlobalSep Corporation, 1610 Jefferson Ave., LaGrande, Oreg. 97850, the operation of which is described in connection with FIG. 6 below, but may be other suitable electro-coagulators. The output of electro-coagulator 250 flows to first tank 264 via conduit 278, preferably via gravity flow to near the bottom 265. First tank 264 preferably is made of fiberglass. Samples of the electro-coagulator output may be taken via valve 260. Preferably, first tank 264 is oxygenated. Oxygenation may be provided by a hydrogen peroxide source 274 and feed meter 272 via conduit 276 and/or by an aerator 279 via valve 280. Preferably, the oxygen source is the aerator, as this minimizes the addition of chemicals to the water. Gases, primarily volatile organic chemicals (VOC's) that are produced in electro-coagulator 250, notably hydrogen and at times oxygen, are vented via vent conduit 274, which is preferably a vent open to the atmosphere, and may include a vent fan 275 or other forced ventilation system. First tank 264 preferably includes a hand-hole 270 through which the tank contents may be viewed or accessed. The coagulated solids in the water settle to the bottom 265 of first tank 264, which is preferably cone-shaped to facilitate efficient removal of the solids via valve 268. The effluent from first tank 264 may be sampled via valve 270. First tank 264 provides a hydraulic flow break in that it isolates the flow through first portion 212 of system 100, including electro-coagulation unit 250, from second portion 213 of system 100, including micro-filter 290. The first portion 212 or EC stage 212 of the system 100, particularly electro-coagulation unit 250 and first tank 264, removes any suspended solids in the water by causing the solids to coagulate into flock particles which settle in tank 264. In terms of particle size, it removes particles of a micron or larger, and preferably also particle up to 0.1 micron in size.

System flow proceeds via conduit 284 connected to the side of first tank 264 to micro-filter pump 286, then to conduit 289. Each pump in the system, such as 286, includes a variable speed controller, such as 285, which is controlled via control system 110. A pressure gauge 288 is connected to conduit 289 to provide control of the flow to micro-filter 290. Micro-filter 290 is preferably a Flowtech™ carbon/silica inorganic 0.1 micron cross-flow filter, but may be other suitable filters that remove particles of 0.1 micron or larger. Cross-flow filter 290 includes a permeate side 292 and a reject side 191. Reject water exits via conduit 293 and back pressure valve 294 and preferably flows into the first tank 264, preferably into the top 267 of the tank so as to prevent it from stirring up solids. Pressure in reject conduit 293 is monitored via pressure gauge 295. Reject water may be sampled via valve 296. The concentrate from reject side 291 may be directed to an alternate route via conduit 298 and valve 302. In this case, a flow meter 300 monitors the flow of the concentrate. The filtered side 292 of micro-filter 290 is passed to second tank 330, also referred to herein as the nanofiltration tank, via conduit 312 and 324. The filtered water may be sampled via valve 306 connected to conduit 312. Flow in conduit 312 may be controlled by second rank capacity control valve 308. A pressure gauge 304 and flow meter 310 may be attached to conduit 312 to monitor pressure and flow, respectively. Preferably, prior to passing into second tank 330, the water is cooled with cooling system 320, which will be described in detail below in connection with FIG. 4. The second portion 211 of system 100, including micro filter 290, removes particles up to about 0.01 micron in size, and preferably even up to about 0.03 microns, such as colloidal silica.

Turning to FIG. 2B, the micro-filtered and cooled water is fed to second tank 330 via conduit 324, preferably to the top 331 of the tank. The pH of the contents of second tank 330 may be monitored via a pH sensor 332 attached to the tank. Second tank 330 provides a hydraulic break that isolates the flow through second portion 213 of system 100 and third portion 214 of system 100 that includes nanofilter 360. The water preferably exits second tank 330 via line 334 which is connected to nanofilter pump 338. Pump 338 pumps water through conduits 340 and 354 to nanofilter 360. Preferably, a prefilter 344 is connected between pump 338 and nanofilter 360. Preferably, prefilter 344 is a five micron filter, the purpose of which is to protect nanofilter 360 from particles that can originate from the inner surfaces of conduits and other parts of the system. A pressure gauge 342 is preferably connected to conduit 340 to monitor the pressure of the water applied to the nanofilter 360. A source 350 of acid, preferably muriatic acid, may be connected to nanofilter input conduit 354 via metering unit 352. Nanofilter 360 is preferably a cross-flow spiral-wound membrane filter having a reject side 361 and a permeate side 362, though other membrane structures, such as tubular, may be used. In the preferred embodiment, a Hyrdanautics™ membrane housed in a Code Line™ housing is used. The reject or concentrate water is directed back to second tank 330, preferably to the top 331 of the tank, via conduit 366. The flow from nanofilter reject side 361 may be monitored by a flow meter 363 attached to conduit 366. A back pressure valve 364 may be used to control back pressure in conduit 366. The reject or concentrate from nanofilter 360 may be directed to an alternate route via conduit 368 and valve 372. The flow in conduit 368 may be monitored with flow meter 370. The conductivity of the contents of second tank 330 may be adjusted via drain 336 and/or valve 372. That is, the reject water from nanofilter 360 will generally have a higher conductivity than the water coming from micro-filter 290. By partially draining second tank 330 or by venting water from the nanofilter 360, the conductivity may be controlled. A feature of the invention is that this draining or blow-down of second tank 331 is small. Preferably, the blow-down of second tank 331 is less than 10% of the water that enters the tank, more preferably, less than 7%, and most preferably less than 5%. The third portion 214 of system 100, including nanofilter 360, removes most particles up to about 0.004 microns in size, including aqueous salts sand some, though not all, metal ions.

The permeate side 362 of nanofilter 360 is connected to third tank 380, also referred to herein as the reverse osmosis tank, via conduit 378, preferably to the top 382 of third tank 380. Conduit 379 is connected to the nanofilter permeate conduit 378 via valve 377. Conduit 379 feeds nano-filter permeate water to the processing water of cooling tower 460, for reasons to be described further below. Nanofilter permeate may be sampled via valve 374, and the flow of the permeate may be monitored via flow meter 376 attached to conduit 378. The pH of the contents of third tank 380 may be monitored via a pH sensor 384 attached to tank 380. Third tank 380 provides a hydraulic break that isolates the flow through third portion 214 of system 100 from that of fourth portion 215 of system 100 that includes reverse osmosis filter 400. Water exits tank 380 via conduit 384 connected to pump 390. A drain valve 386 is also connected to exit conduit 384. The water is pumped to reverse osmosis filter 400 via conduit 399, and preferably through filter 394 connected into the conduit. Filter 399 is preferably a 5 micron filter, which protects the reverse osmosis membrane from particles that can originate from the inside of conduits, pumps, etc. The pressure in conduit 399 preferably is monitored via a pressure gauge 392 connected to the conduit. Preferably, a source of acid, preferably muriatic acid, is metered to conduit 399 and reverse osmosis filter 400 by meter 398. Reverse osmosis filter 400 is preferably a spiral wound cross-flow filter, preferably a Hydranautics™, FilterTec™, or Koch™ filter. The reject or concentrate side 401 of filter 400 is preferably directed via conduits 417 and 409 to third tank 380, preferably to the top 382 of the tank. Back pressure valve 406 may be connected to conduit 417 to permit control of the pressure in filter 400 and the flow into conduit 409. The flow may be monitored via flow meter 405, and the reject concentrate from RO filter 400 may be sampled via valve 404. An alternate route for the RO concentrate may be provided via conduit 407 and valve 410. Flow meter 408 may be connected to conduit 407 to monitor the flow through the conduit. The permeate from RO filter 400 is passed to storage 172 (FIG. 1) via conduits 418 and 158. The storage 172 may be a lined lagoon ready for pipeline or trucking to local drilling and fracturing operations, a tank, or other water storage apparatus. A flow meter 420 preferably is connected to conduit 418 to measure the flow of clean water. The flow may be controlled via valve 424 and may be sampled via valve 416. Alternatively, the flow of clean water may be partially or fully directed to recirculate through the system 100 via conduit 230, valve 414 connected along the conduit, and valve 424. If potable water is desired, a source 425 of disinfectant, such as chlorine, may be provided and may be metered to the fresh water via meter 426 via conduit 427. The fourth portion of system 100, including reverse osmosis system 400, removes all remaining dissolved solids, such as aqueous salts and metal ions, leaving the water with the quality of fresh water.

Figure 3:
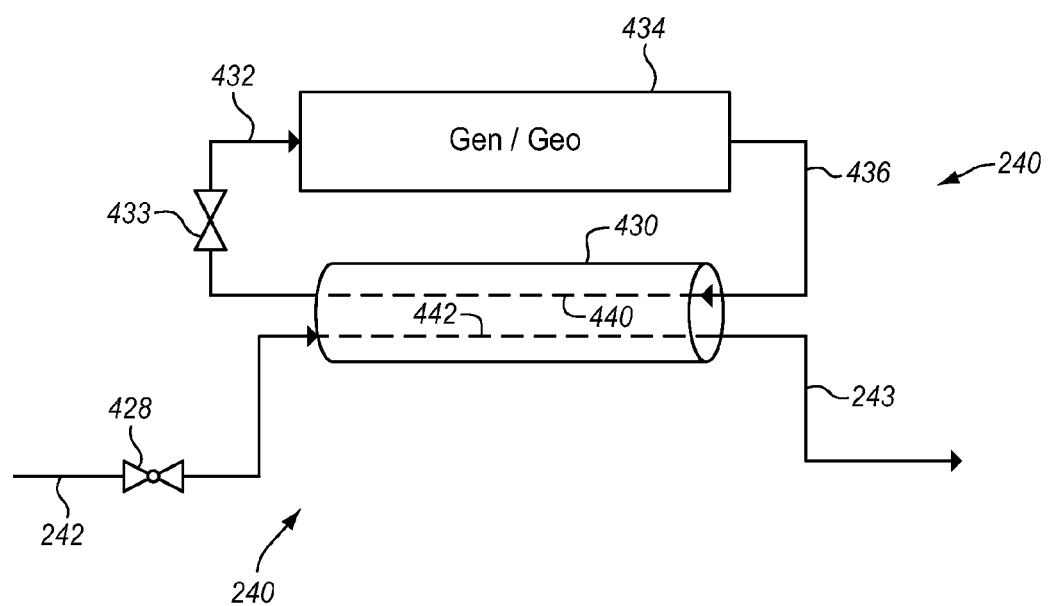
FIG. 3 is a block diagram illustrating an optional heating/cooling section immediately after the water input in FIG. 2A.

FIG. 3 is a block diagram illustrating an optional heating/cooling section immediately after the water input in FIG. 2A. Heating/cooling system 240 may be used to heat the incoming water if it is below the optimum temperature for optimum functioning of electro-coagulation unit 250 and micro-filtration unit 290, such as when the system is to be used in the winter. It can also be used to prevent freezing of the system while it is being transported or is in an idle condition. It also may be used to cool the water if it is above the optimum temperature for optimum functioning of electro-coagulation unit 250 and micro-filtration unit 290, but this would be unusual. Generally, the higher the temperature of the water, the more efficient is the electro-coagulation; that is, better electro-coagulation is obtained with less electricity. Thus, the front end should be as close to the boiling point as possible, though, again, water this hot would be unusual. System 240 preferably includes a heat source or sink 434 and a heat exchanger 430. A heat exchanger 434, 464, 539 is an apparatus for efficient transfer of heat from one medium to another such as fluid-to-fluid, liquid-to-liquid, liquid-to-gas, gas-to-gas, etc. In the heat exchanger 430, the heat is transferred from the heated input water 442 to the circulating water 440. The heat then is dissipated through the cooling stage 434 as the circulating water 122 continuously passes through the heat exchanger 430 to absorb more heat. Typical heat exchangers include plate, or plate and frame, or shell and tube, among many others. Other heat exchangers may be selected based on specific needs and efficiency concerns, among many other reasons. The present invention is not limited to any particular type of heat exchanger, except to the extent specified and claimed. The flow of water from input conduit 144 is controlled by valves 234 (FIG. 2A) and 242. Returning to FIG. 3, the flow of fluid in heat exchanger 430 is controlled by valve 433 in conduit 432. The heat exchange fluid may be water or a refrigerant gas. If water is to be heated, the heater is preferably a geothermal source, such as 147, described in more detail below, or may be the cooling system of the generator 118 that powers the system. In hydrocarbon regions, available energy such as a natural gas flare is one way to provide heated water in a cost effective manner. If cooling of the incoming water is required, a ground water heat exchange system, such as 147 (FIG. 1), preferably is used.

Figure 4:
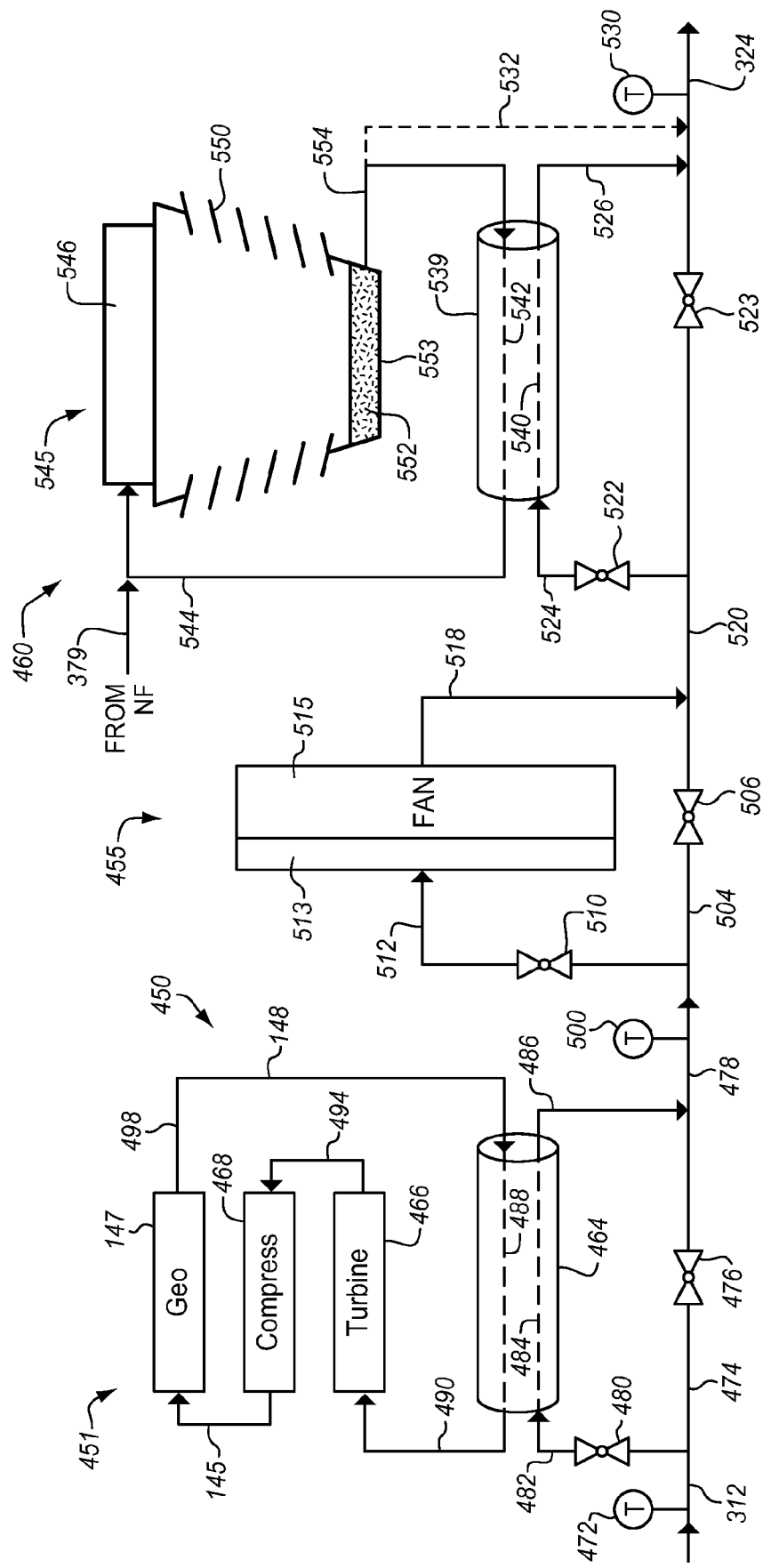
FIG. 4 is a block diagram illustrating the cooling section prior for cooling the permeate or cleaned water output of the micro-filter unit of FIG. 2A.

Turning to FIG. 4, the preferred cooling system 320 according to the invention is illustrated. Preferably, cooling system 320 includes three subsystems: a geothermal system 450, air cooling system 455, and a cooling tower 460. Depending on the amount of cooling needed, one, two or all of the three subsystems are used. Valves 480 and 476 direct all the water through geothermal subsystem 450 when valve 480 is open and valve 476 is closed, and cause the water to bypass the geothermal system when valve 480 is closed and valve 476 is open. Valves 510 and 506 direct all of the water through air cooling subsystem 455 when valve 510 is open and valve 506 is closed, and cause the water to bypass the geothermal system when valve 510 is closed and valve 506 is open. Valves 522 and 523 direct all of the water through geothermal subsystem 450 when valve 522 is open and valve 523 is closed, and cause the water to bypass the geothermal system when valve 422 is closed and valve 423 is open. Geothermal subsystem 450 comprises water heat exchanger 464 and refrigerating system 451. Heat exchanger 464 comprises a water conduit 484 and a refrigerant conduit 488. Refrigeration system 451 includes a turbine, a compressor, and a geothermal heat exchanger 147. The refrigerant absorbs heat from the water in heat exchanger 464 and passes through conduit 490 to turbine 466 where the refrigerant expands and drives turbine 466, utilizing the energy absorbed from the water. The refrigerant passes to compressor 468 via conduit 494 where it is compressed and heated. It then passes to cooling section 147 which is preferably a geothermal heat exchange system, via conduit 145, and then via conduit 148 back to water heat exchanger 464. Air cooling system 455 preferably comprises a radiator 413 and a fan 515. If air cooling is desired, water passes to radiator 513 where it is cooled by fan 515 and then back to conduit 520 via conduit 518. Cooling tower system 460 preferably comprises a water heat exchanger 539 and tower system 545. Tower system 545 preferably includes a fluid distributor 546, a flow tower 550, a collection basin 553, and circulating coolant 552, which is preferably water. Preferably, either cross-flow or counter-flow cooling systems may be used. A mechanical cross-flow-induced draft tower is a more economical approach where the water conversion system 100 is a mobile system, due to its simplicity and weight. A counter flow natural draft tower is particularly applicable where the water conversion system 100 is a potable water facility that is fixed in place or otherwise intended to be operable for long periods. Cooling tower 460 primarily cools by evaporation, but it also utilizes sensible heat loss and transference. Sensible heat loss occurs due to the hot water losing energy to the cooler air without any water loss. Transference occurs when the hot water is in contact with a metal surface, such as the piping in the cooling tower and heat exchanger. A typical cooling tower provides for temperature change (DT) in the range of 10° F. to 20° F. Alternatively, a waste heat evaporator can be used which uses the evaporation of water to cool the system and reduce the reject water to a solid that can be recycled or disposed of in a solid disposal system. A spray system may be used with such an evaporator. If the cooling tower 460 is selected, water passes along conduit 524 to heat exchanger conduit 540 where it transfers heat to coolant, preferably water, in heat exchanger 539, and returns to conduit 526 and thence to exit conduit 324. Coolant, in heat exchanger conduit 542, absorbs heat and then passes along conduit 544 to distributor 546 of cooling tower 460. After the coolant is processed in flow tower 550, it is collected in collector 553 and passes through conduit 554 back to heat exchanger 539. As mentioned above, nanofilter permeate water resupplies water lost in cooling tower 460 via conduit 379. A feature of the invention is that the cooling tower does not utilize blow-down or chemicals. A temperature gauge 530 is connected to conduit 324 to monitor the temperature of the water exiting the cooling system.

In one embodiment of the invention 100, heat exchanger 539 and the conduits 524, 540, 542, and 526 and valve 522 are eliminated, and water 552 from collector 553 flows to conduit 324 via conduit 532. Since the water 552 is chemically essentially the same as the water coming from the outlet 378 of NF stage 214, it can be fed back into the NF stage via conduit 324.

The mixing of the hot water coming from conduit 312 with the cooled water cools the water just as efficiently, in fact more efficiently, as heat exchanger 539. Any large particles that may get into water 552 during the evaporation process either settle in NF tank 330 or are filtered out in filter 344. In this embodiment, valve 377 is adjusted so that a larger portion of the flow in conduit 378 flows back to cooling tower system 545 than in the heat exchanger embodiment.

Figure 5:
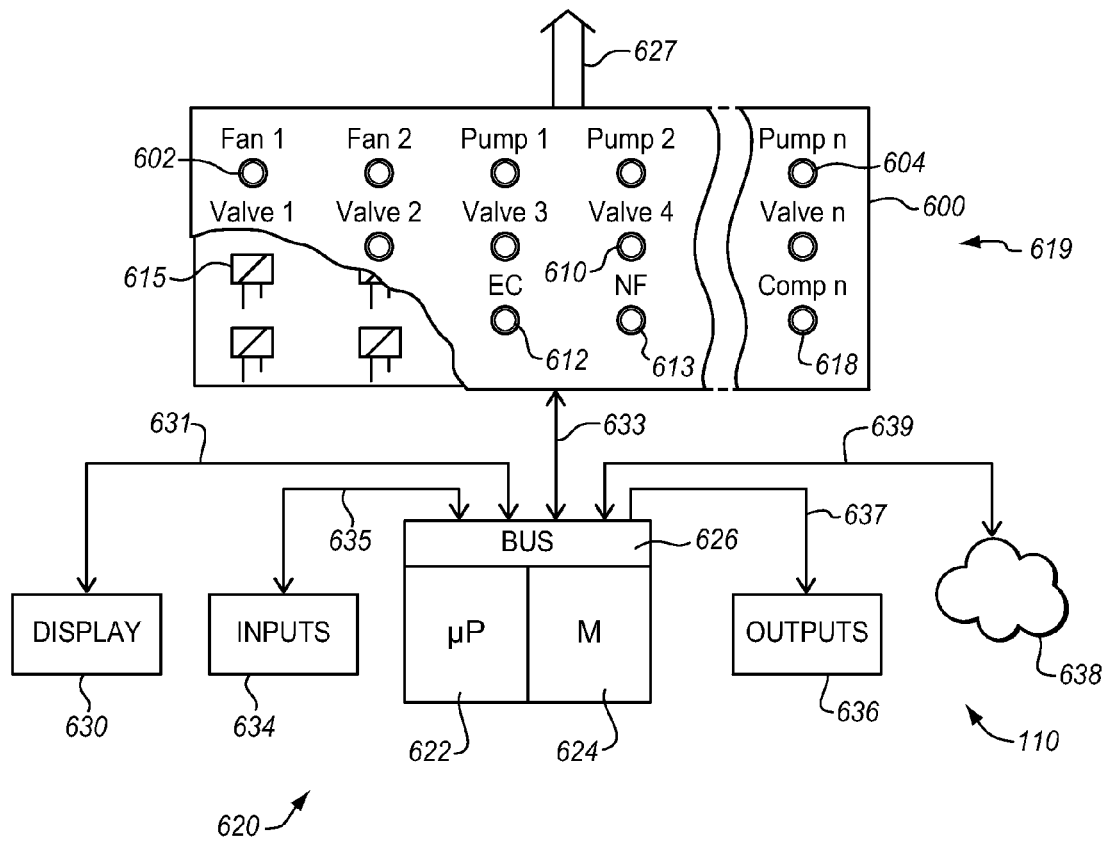
FIG. 5 is a partially cut-away plan view of the control system of controlling the operation of the water conversion system of FIGS. 2A and 2B.

FIG. 5 is a partially cut-away plan view of the control system 110 for controlling the operation of the water conversion system 100. Control system 110 comprises manual control system 619 mounted on a control panel 600 and computer 620. Manual control system 619 preferably comprises switches, such as 602, 604, 610, 612, 613, and 618 to turn on and off the fans, pumps, valves, meters, electro-coagulator, filters, and other devices of the system. Each switch is preferably a push button switch, and each switch operates a relay, such as 615. Manual control panel 600 communicates with the various motors, etc., of the system via electrical cables 627. Computer 620 is connected to control panel 600 via electrical connection 633, and preferably includes microprocessor 622; memory 624; bus 626; input devices 634; such as a keyboard, mouse, gauges, sensors, meters, etc., connected to bus 626 via electrical connection 635; output devices 636, such as one or more printers, meters, variable speed pump controllers, etc., connected to bus 626 via electrical connection 637; and a display 630 connected to bus 626 via electrical connection 631. Computer 620 may also be connected to the Internet 638 or other LAN via electrical connection 639. The electrical connections 631, 633, 635, 637, etc., may be cables or wireless.

Figure 6:
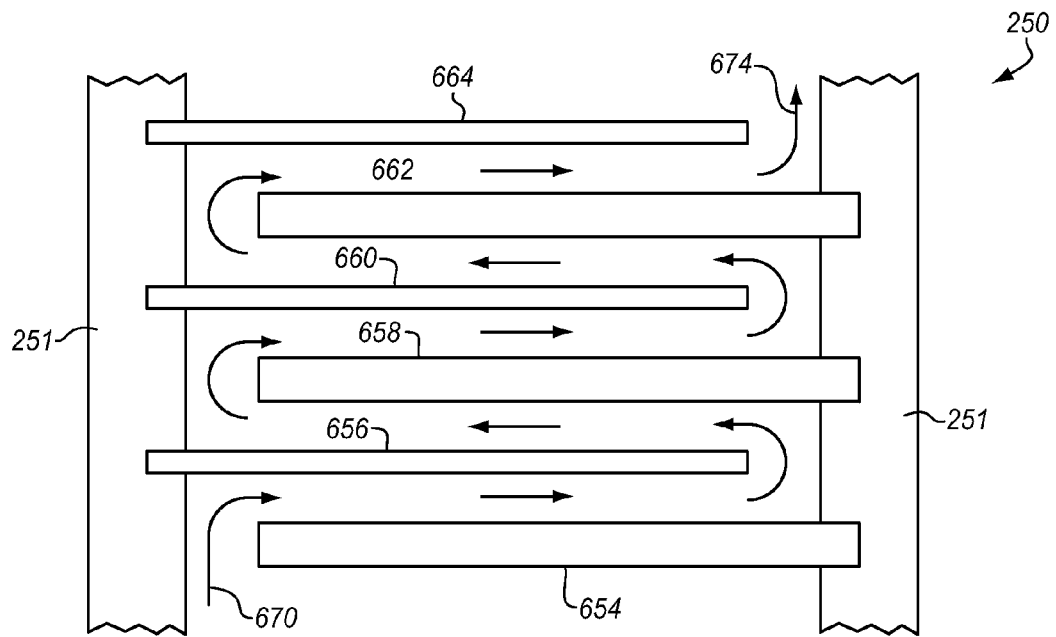
FIG. 6 is a cross-sectional plan interior view of the electrical coagulation unit of FIG. 2A.

FIG. 6 is a cross-sectional plan interior view of the electro-coagulation unit 250 (FIG. 2A). Electro-coagulation unit 250 includes water tank 251 and electrodes 654, 656, 658, 660, and 664. Electrodes 654, 656, 658, 660, and 664 preferably are made of alternating materials. The materials are preferably aluminum and iron, but may be of other materials as known in the art. Water circulates around the electrodes as shown at 670 and 674. The electrodes of different materials are made in different thicknesses to allow for different rates of erosion. Preferably, the electro-coagulation unit uses high voltage and low current, and the materials that are coagulated and then precipitated in first tank 264 can be varied by varying the voltage. Ionic suspended materials are changed to insoluble forms by the plates. Highly charged metal hydroxide species are introduced into the water to neutralize the electrostatic charges on suspended solids, which otherwise tend to make the particles repel each other. The neutralization facilitates coagulation or agglomeration.

In one example, the water provided to the electro-coagulation stage 110 typically measures conductivity of approximately 10,000 to 50,000 microsiemens. In such an instance, the water processed by (permeate leaving) the electro-coagulation stage 110 typically measures conductivity of 7,500 microsiemens.

Figure 7:
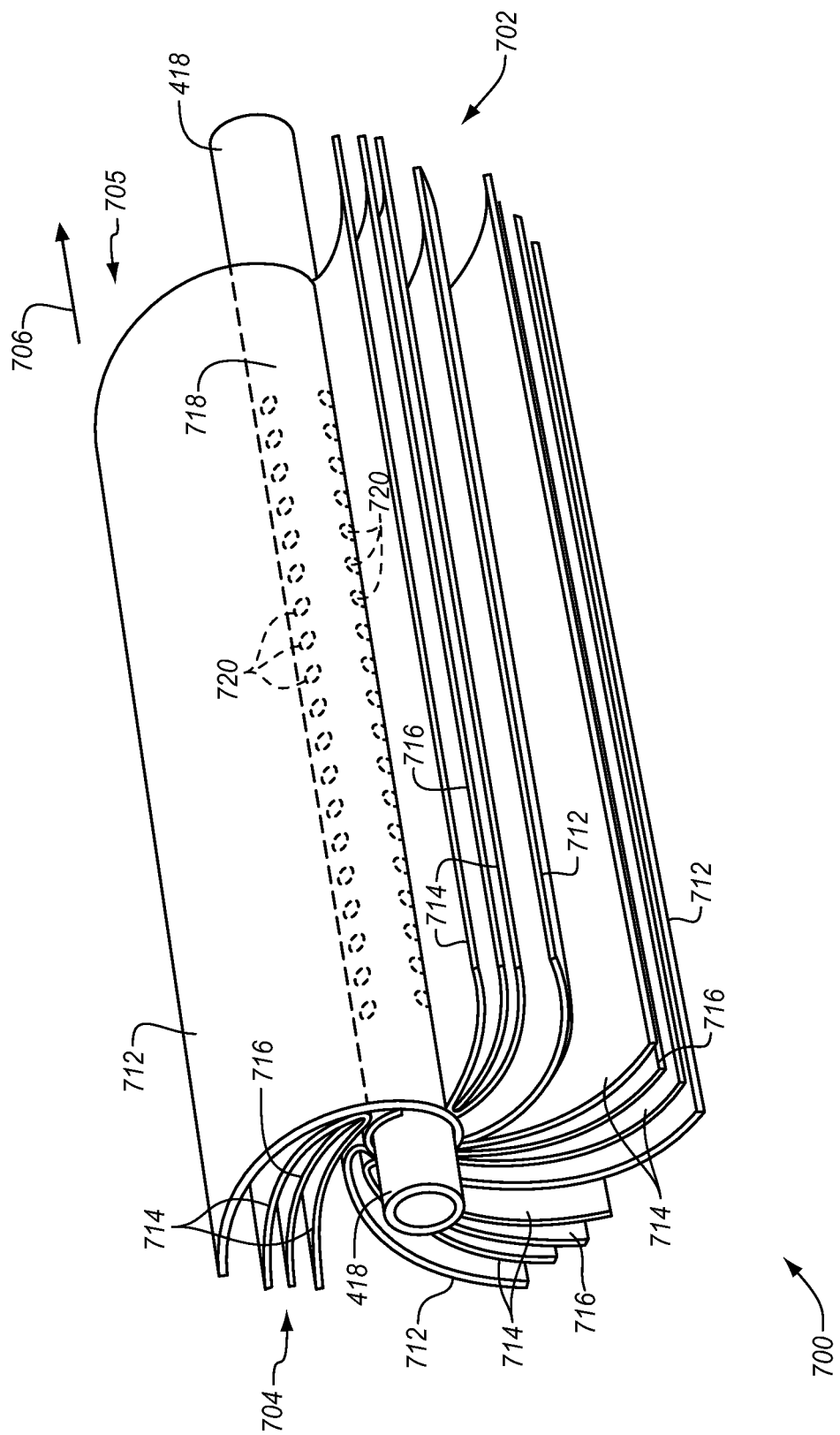
FIG. 7 is a partially cut-away perspective view of the reverse osmosis unit of FIG. 2B.

FIG. 7 is a partially cut-away perspective view of the nanofiltration and reverse osmosis cartridge 702. The nanofiltration cartridge is enclosed in housing 361, while the reverse osmosis cartridge is enclosed in housing 401 (FIG. 2B). Both the nanofiltration and reverse osmosis systems preferably utilize a spiral wound cartridge, with the reverse osmosis cartridge having a finer filter membrane. Preferably, the membranes are made of a polymer. Cartridge 702 preferably comprises a plurality of layers 712, 714, and 716 wrapped around a collector 718 which is perforated with holes 720. Layer 712 is preferably a permeable carrier membrane, layer 714 is preferably a permeable reverse osmosis membrane, and layer 716 is a feed carrier. Water enters the cartridge from conduit 399 (FIG. 2B) in the direction 704 through feed carrier 716, passes through reverse osmosis membrane 714, enters carrier membrane 716, and flows through the carrier membrane toward holes 720. The water that passes through nanofiltration or reverse osmosis membrane 714 is collected in collector 718 and passes into conduit 418. Water that does not pass through reverse osmosis membrane 714 flows out the end 705 of the cartridge in the direction 706, is collected, and passes into conduit 417. Typically, particles ranging in size from less than 0.001 microns up to nearly 0.01 microns are removed from the water via nanofiltration, and smaller particles are removed from the water via reverse osmosis.

Pumps such as 286 are preferably Frenic™ Mini pumps, with the micro-filter pump being a 7.5 horse power pump, and pumps 338 and 390 being 7 horse power pumps. Peroxide metering unit 272 and acid metering units 352 and 398 are preferably Aquatrac™ Multiflex meters. Filters 344 and 394 are preferably Falthrap™ spiral filters. Pump size and make will vary with system size.

The incoming water is pumped or free flowing from between approximately 2,500 to 10,000 feet below the ground and will have a different temperature, depending on the location. The preferred temperature to run the front end 211 of the system 100, i.e., the first portion 212 and second portion 213, is 140° F. The preferred temperature to run the back end 217 of the system, i.e., third portion 214 and fourth portion 215, is between 40° F. and 105° F., more preferably between 60° F. and 90° F., and most preferably between 70° F. and 80° F. In typical areas, such as the Bakken formation, incoming water has an average temperature of 150° F., TSS in the 100 to 1,000 ppm range, TDS in the 10,000 to 50,000 ppm range, and conductivity above 10,000 microsiemens and often approximately 30,000 microsiemens. Further, there are trace samplings of organic compounds such as benzene, toluene, ethyl benzene, and xylene, among others. These organic compounds present a threat to the membranes in the back end 217 of the process; thus, they are removed by the front end 211. Those of skill in the art will readily appreciate that the depth of the water below ground, the average temperature of the water, and the conductivity varies according to the specific location and circumstances. Such variations are within the scope and operation of the water conversion system 100.

A feature of the invention is that essentially all of the contaminants in the water are removed without creating significant environmental degradation. A related feature is that the system provides a balanced flow through very different types of water processing, e.g., electro-coagulation, micro-filtration, cooling, nanofiltration, and reverse osmosis. By "balanced flow," in general we mean that the flow of water into the system 100 as a whole is balanced by the flow of water out of the system. In particular, "balanced flow" means that the system is controlled so that choke points where the water backs up are reduced or eliminated. Level sensors 263, 329, and 385 sense the level of water in each of the first tank, second tank, and third tank, respectively. Factors in obtaining the balance are the flow breaks strategically located between choke points and the control of the system flow by control system 110 using the level sensors and valves. The EC unit 250, the NF unit 360, and the RO unit 400 are potential choke points.

Another feature of the invention is that the temperature of the water is controlled in the system 100 so that the temperature of the water is near optimum for the various water treatments. The water temperature is controlled to significantly increase the efficiency of the inorganic membranes in the micro-filter 290. Inorganic membranes have a reverse efficiency curve as compared to polymeric membranes and are far more efficient with hotter water due to reduced viscosity. Water from deep wells, particularly in the summer, can be too hot for the micro-filter, and, particularly in the winter, after traveling through exposed conduits, may be too cold for optimum operation of the electro-coagulation unit and the micro-filter. Thus, this results in efficient and safe removal of suspended solids and organic compounds. On the other hand, heat can deteriorate or destroy polymeric membranes as used in the nanofiltration unit and the reverse osmosis unit. Thus, between the front end and back end, the water is cooled to a temperature between 40° F. and 90° F., and more preferably between 50° F. and 80° F. to provide for the desired efficiency of the nanofiltration membrane and the reverse osmosis membrane. Temperature for operation of this membrane is preferably 60° F. to 80° F. and most preferably 75° F. One should not go below 40° F. to avoid any danger of freezing of any part of the system, and preferably not higher than 90° F.; otherwise, these membranes would be very inefficient. At 100° F., the membranes essentially would not be working. Thus, within the temperature constraints of the front end of the system, preferably 60° F. or more of cooling is required.

A related feature of the invention is that the system provides water of a good chemical balance for optimum operation of the water cooling system. After the water is cooled to the proper temperature, filtration through the nanofiltration membrane removes large molecules, including most of the calcium and magnesium, softening the water. A portion of permeate from the nanofiltration stage 360 is fed back to the cooling tower 460 to replace the water that evaporates. Via continued replacement, the circulating water in the cooling tower 460 has the same chemical make-up as the processed water that is provided at the output 378 of the nanofiltration stage 360. A typical evaporative cooling stage 460 loses approximately one gallon per 1,000 gallons of water processed for each degree of cooling provided. That is, for each degree of cooling, one gallon of water is lost due to evaporation per 1,000 gallons of water processed. For example, to provide 20° F. of cooling, then 20 gallons of water has to be replaced for each 1,000 gallons processed through the cooling stage. Preferably, output water is added to the circulating water via conduit 379 in proportion to the amount of cooling that is provided.

The softer water added to the evaporative cooling stage 545 improves the cooling efficiency as it prevents scale build up. Calcium and magnesium are polyvalent ions that have a reverse solubility curve. Iron also has a reverse solubility curve and is sometimes present in the water as well. A reverse solubility curve ion is an ion that does not settle out of the water as the water cools. The reverse solubility ions are removed from the water by the nanofiltration stage so that they cannot cause problems by settling on the heat exchanger. The nanofiltration stage 360 removes substantially all, i.e., 99 percent or more, of the hardness concentration from the cooled water. Preferably, the hardness concentration of the water is reduced so that less than one percent of the original hardness content of the water remains. That is, less than one percent of the polyvalent reverse solubility curve metals remain in the water. Once the water conversion process begins, no externally supplied water needs to be added to the cooling stage 320. Additionally, the cooling stage 320 and the cooling tower 460 in particular are zero liquid discharge systems. Cycling up of the water allows the minerals already present in the water to prevent corrosion in the cooling tower. An added benefit of the cooling stage 320 in the disclosed water conversion system 100 is the elimination of the need for adding chemicals to the cooling water. Heretofore, a foundational requirement for cooling towers has been to add chemicals in the cooling tower to avoid fouling the heat exchanger. For example, a typical cooling tower requires the addition of a corrosion inhibitor, an anti-scaling polymer, due to calcium and magnesium content, and biocides to inhibit microbial growth. Since the water is softened, the circulating water 542 will not drop scale in the heat exchanger 539. Thus, there is no need for an anti-scaling polymer. In the cooling tower 545 of the invention, the high level of chlorides, particularly sodium chloride, and the increased pH level of the high sodium content water operate as a biocide that restricts the growth of microbes. As the circulating water 122 is cycled up within the cooling stage 120, the silica content is also cycled up. The increased silica level inhibits corrosion within the cooling stage 120. In this way, the corrosion inhibitors are effectively replaced. Also, the increased salinity and pH level of the circulating water 122 prevents microbial growth. Since nothing can grow because of the salt content and high pH level, the addition of biocides also is not necessary. The presence of polyvalent ions further required blow-down on a regular basis, which also increased the amount of water that was used. Chemical cooling tower methods typically blow-down 10% to 20% of the water and pump in more water to replace the blow-down, which was required to dilute the hardness of the water which increased because of evaporation. Because the water in the tower 545 is softened, no blow-down is required. The cooling system 320 of the invention, therefore, is a zero liquid discharge system. Removing the hardness from the water allows any remaining minerals to settle out of the water and to the bottom 553 of the cooling tower system 545. Such minerals are easily removed during periodic cleaning. In some circumstances, a minimal amount of acid is added to correct the pH level of the water. This pH correction does not change the zero blow-down requirement.

Another feature of the invention is that the water provided at the output 158 of the system 100 is chemically homogenous. That is, water produced at one moment in time is substantially chemically identical to the water at an earlier or later moment in time. Further, because of the flexibility of the system 100, the water produced at one location is substantially chemically identical to the water produced by the system when moved to another location.

The waste water produced by the system is minimal and is such that it can be used in an evaporator to recover salts as a byproduct. If waste water must be discarded, the amount that is discarded is small enough that it can be economically pumped into a very deep well, preferably five thousand feet deep or more, more preferably ten thousand feet deep or more, where it will not contaminate local water sources.

The resulting permeate from the nanofiltration membrane also provides excellent feed stock for the reverse osmosis unit which removes the remaining contaminating minerals, primarily sodium chloride. The resulting reject preferably is evaporated to provide a recycled product, namely salt, or deep well injected. Deep well injection is not environmentally disturbing in many areas, because the geologic history mentioned above has already resulted in deep salt deposits.

In one embodiment, the water conversion system 100 is mobile and is assembled on one or more trailers for hauling to a desired location for water conversion. The trailers are pulled to the desired location, and then the trailers are connected to each other via the necessary piping, etc. Upon assembly of the water conversion system 100, a water source 210 is in communication with the water conversion system 100 so that water is pumped from the water source 210 and clean water is delivered to reservoir 172 for containment until it is to be used.

In one embodiment, the water exiting the reverse osmosis stage 150 is stored in a reservoir 180 for containment until ready for use. In one embodiment, the reservoir 180 is a large lagoon. In other embodiments, the reservoir 180 includes tanks, tanker trucks, and/or temporary pipelines. From a lagoon, for example, the water is loaded into tankers for transport to the desired location for use. In another embodiment, a pipeline (not shown) is used for delivering the processed water from the water conversion system 100 to the desired use area such as, for example, a drilling location. In still another embodiment, the water is placed in storage tanks to be held until needed. In yet another embodiment, the water is placed directly into tanker trucks for transport.

The water conversion system 100 also includes a heating system 240 to protect the water conversion system 100 from freezing when the system is dormant. The heating system 240 includes a heat exchanger 430 (FIG. 3) that is in fluid communication with the output 230 of the reverse osmosis stage 400 and the input of the electro-coagulation stage 250. In this way, the heating system 240 completes a continuous loop that recirculates heated water throughout the water conversion system 100. Preferably, the heating system 240 uses the geothermal properties of the below ground water by pumping it through the heat exchanger to allow the ground water to heat the colder temporary recirculation loops. Of course, when the heating system 240 is in use, the cooling stage 320 of the water conversion system 100 preferably is not operative. Transportation of the water conversion system 100 during colder weather also poses risk of freezing. During such transportation, alternative heat sources are used to provide heat to the heat exchanger of the heating system 240. In one embodiment, exhaust gas from the truck engine provides a source of heat to the heat exchanger so that the heating system 240 provides heat to the water circulating through the stages. Preferably, during such idle and transportation periods, the water temperature is kept between 40° F. and 105° F., more preferably, between 40° F. and 90° F., and most preferably between 40° F. and 80° F. In all eventualities, the water in system 100 is kept above 32° F. and below 212° F.

The heat exchanger 110 receives input water 102 having a first hardness concentration and a first temperature, and the circulating water 122 provides cooling to the input water 102 so that the heat exchange 110 and the cooling stage 120 in combination provide cooled water 112. The cooled water has a second temperature that is reduced via a specified amount from the first temperature. The circulating water 122 remains free from added chemicals. The softened water has a second hardness concentration that is preferably less than one percent of the first hardness concentration. In one embodiment, the nanofiltration stage 130 removes substantially all hardness from the cooled water 112.

In another embodiment, a water cooling method eliminates the need for blow-down and for added chemicals. The water cooling method preferably includes the steps of (i) receiving input water 102 having a first hardness concentration and a first temperature, (ii) providing circulating water 122 from a cooling stage 120 to a heat exchanger 110 to provide cooled water 112 from the input water 102 wherein the cooled water has a second temperature that is reduced via a specified amount from the first temperature, (iii) removing hardness from the cooled water 112 via nanofiltration 130 to provide softened (output) water 132 having a second hardness concentration that is preferably less than one percent of the first hardness concentration, and (iv) providing an amount of the softened (output) water 132 to the circulating water 122. The circulating water 122 has substantially the same chemical content as the softened (output) water 132, and the need for blow-down is eliminated. The circulating water 122 does not require added chemicals.

A confidential test of the system 100 by an independent environmental test organization was carried out at the Rocky Mountain Oil Test Center (RMOTC) in Casper, Wyo. The mobile system was constructed in Florida and successfully traveled to Wyoming and back with no significant damage despite strong wind storms in Wyoming and Colorado. At the RMOTC, the water source well was run for one hour each morning before testing to raise temperature and insure a representative sample of water to test. EC was run at high pulse setting due to lower than expected TDS. Cooling was limited to air cooling due to low ambient air temperatures. To stay on the membrane operating curve, membranes were run at the low end of their flux, i.e., water flow, curves and at about 125 PSI, which is on the low end of the pressure curve. The front end 211 was run at about 130° F. to 150° F., and the back end 217 was run at less than 85° F., with more than 60° F. change in temperature. The test results show a confirmation of the expectations of each of the front end 211, the cooling system 320, and the back end 217 of the system. The hot front end 211 of the system took hydrocarbon and turbidity levels down to trace levels allowing successful operation of the back end 217. The cooling section 320 worked above expectation and delivered 60° F. or more change in temperature. Again, this successful operation of this section, taking 130° F. water down to 70° F., allowed for the successful operation of the back end 217. The back end 217 operated exactly as expected. The results indicated that the system can be successfully operated over a broad range of parameters. Over 95% removal of both suspended and dissolved solids was obtained, and the output water was suitable for a potable water source.

Now that the water conversion system of the invention has been described, it is evident that it can be used for purposes other than fracking. As mentioned above, it can be used to provide emergency water when storms and natural or manmade disasters damage a water supply. A feature of the invention is that, because it is a balanced system and requires little maintenance, it can sustain large fresh water flows almost indefinitely. The invention typically is capable of supplying twenty thousand barrels a day of fresh water to almost any site.

Similarly, it will be recognized by those skilled in the art that an exemplary use of the disclosed water cooling system 320 within a water conversion system 100 for cleaning brackish or otherwise contaminated water has been provided. While the water conversion system 100 illustrates one exemplary use of the water cooling system 320, it should be noted that the water cooling system 320 is not limited to such uses.

Now that the invention has been described, those skilled in the art will be able to modify the invention and use it for other purposes. For example, the water cooling system 320 and specifically the portion 460 of it described above may provide cooling of input water for any system or building having a cooling stage, and in particular, a cooling tower. The water cooling system 320 and specifically system 460 provides suitable water cooling technology for manufacturing plants, food plants, power plants, nuclear power plants, and large commercial buildings that use refrigeration for cooling. The water cooling system disclosed herein works particularly well for any influent with low total suspended solids.

There has been described a water conversion system that is mobile, minimizes environmental impact, and is particularly useful in providing large quantities of fresh quality water in arid environments. While the present invention has been illustrated by description of several embodiments, and while the illustrative embodiments have been described in considerable detail, it is not the intention of the Applicants to restrict or in any way limit the scope of the appended claims to such detail. Additional advantages and modifications will readily appear to those skilled in the art. The invention in its broader aspects, therefore, is not limited to the specific details, representative apparatus and methods, and illustrative examples shown and described. Accordingly, departures may be made from such details without departing from the spirit or scope of the invention claimed below.

What is claimed is:

1. A water conversion system for providing fresh water at a location where it is needed, said system comprising:
    a water input connected to a heating unit for providing heated input water at a temperature of 105° F. or more, said water containing suspended solids and dissolved solids;
    an electro-coagulation (EC) stage in fluid communication with said water input for receiving said heated water, and for removing at least a portion of the total suspended solids (TSS) in said heated water, to provide heated EC water, wherein said EC stage includes a pulsed power drive;
    a microfiltration (MF) stage in fluid communication with said EC stage for receiving said heated EC water and for removing at least a portion of any remaining suspended solids and at least a portion of the total dissolved solids (TDS) from said heated EC water to provide heated MF water;
    a cooling stage in fluid communication with said MF stage for receiving said heated MF water from said microfiltration stage and for cooling said MF water by at least 10° F. to provide cooled water;
    a nanofiltration (NF) stage in fluid communication with said cooling stage for receiving said cooled water and for removing at least a portion of the dissolved calcium and magnesium compounds from said cooled water to provide softened water, said nanofiltration stage having a nanofiltration stage output, said softened water provided to said nanofiltration stage output; and
    a reverse osmosis (RO) stage in fluid communication with said nanofiltration stage output for receiving said softened water and for removing at least a portion of the sodium content from said softened water to provide fresh water of fresh water quality.

2. The water conversion system of claim 1 wherein said cooling stage includes cooling stage water, and further comprising a water conduit connecting said nanofiltration stage to said cooling stage to provide a portion of said softened water to said water in said cooling stage.

3. The water conversion method of claim 2 wherein the temperature of said cooled brine water is between 40° F. and 80° F.

4. The water conversion system of claim 1, and further including a geothermal brackish water source connected to said water input.

5. The water conversion system of claim 4 wherein said geothermal brackish water has a conductivity of at least 1,000 microsiemens.

6. The water conversion system of claim 1, and further comprising a disinfection unit connected to said reverse osmosis stage of said water conversion system for providing potable water.

7. The water conversion system of claim 1 wherein said cooled water has a temperature between 40° F. and 80° F.

8. The water conversion system of claim 1 wherein said cooling stage is selected from the group consisting of a cooling fan, a cooling tower, and a waste heat evaporator.

9. The water conversion system of claim 1, and further comprising one or more mobile platforms for transporting said water conversion system, wherein each of said stages are secured to and operable from at least one of said mobile platforms.

10. The water conversion system of claim 1, and further including a first flow break tank containing first tank water between said EC and MF stages, a second flow break tank containing second tank water between said MF and NF stages, and a third flow break tank containing third tank water between said NF and RO stages.

11. The water conversion system as in claim 10, and further including a source of an acid and a metering system for adding acid to said second tank water prior to or at said NF stage or to said third tank water prior to or at said RO stage.

12. A water conversion method for providing fresh water from brackish water, said water conversion method comprising:
   providing a source of heated brackish water at a temperature of 105° F. or more;
   removing suspended solids from said heated water via pulsed power electro-coagulation;
   removing solids from the heated water from said electro-coagulation treatment via microfiltration;
   cooling said heated water by at least 10° F. to provide cooled brine water;
   removing magnesium or calcium compounds from said cooled brine water via a nanofiltration stage to provide softened sodium brine water; and
   reducing the sodium brine content of the sodium brine water via reverse osmosis to provide fresh water of fresh water quality.

13. A method as in claim 12 wherein said cooling comprises circulating cooling stage water through a cooling stage, and further comprising providing a portion of said softened sodium brine water to said circulating cooling stage water so that the circulating water has substantially the same chemical content as the sodium brine water provided by said nanofiltration stage.

14. A method as in claim 13 wherein said cooling process has essentially zero blow-down.

15. The water conversion method of claim 12, further comprising disinfecting said fresh water to produce potable water.

16. The water conversion method of claim 12 wherein said cooling comprises an evaporative cooling process selected from the group consisting of vaporization from a cooling tower and waste heat evaporation.

17. The water conversion method of claim 12, further comprising circulating heated water through the water conversion system during an idle mode to protect the water conversion system from freezing, wherein said idle mode comprises deactivating said cooling.

18. The water conversion method of claim 12, wherein the removing suspended solids from said heated water via pulsed power electro-coagulation is continued until the conductivity of the heated water is approximately 7,500 micro Siemens.

* * * * *